No. 791,375. PATENTED MAY 30, 1905.
L. G. SHULTZ.
HAY RAKER AND LOADER.
APPLICATION FILED JUNE 2, 1904.

2 SHEETS—SHEET 1.

Witnesses
E. F. Stewart
C. N. Woodward

Lewis G. Shultz, Inventor.
by C. A. Snow & Co
Attorneys

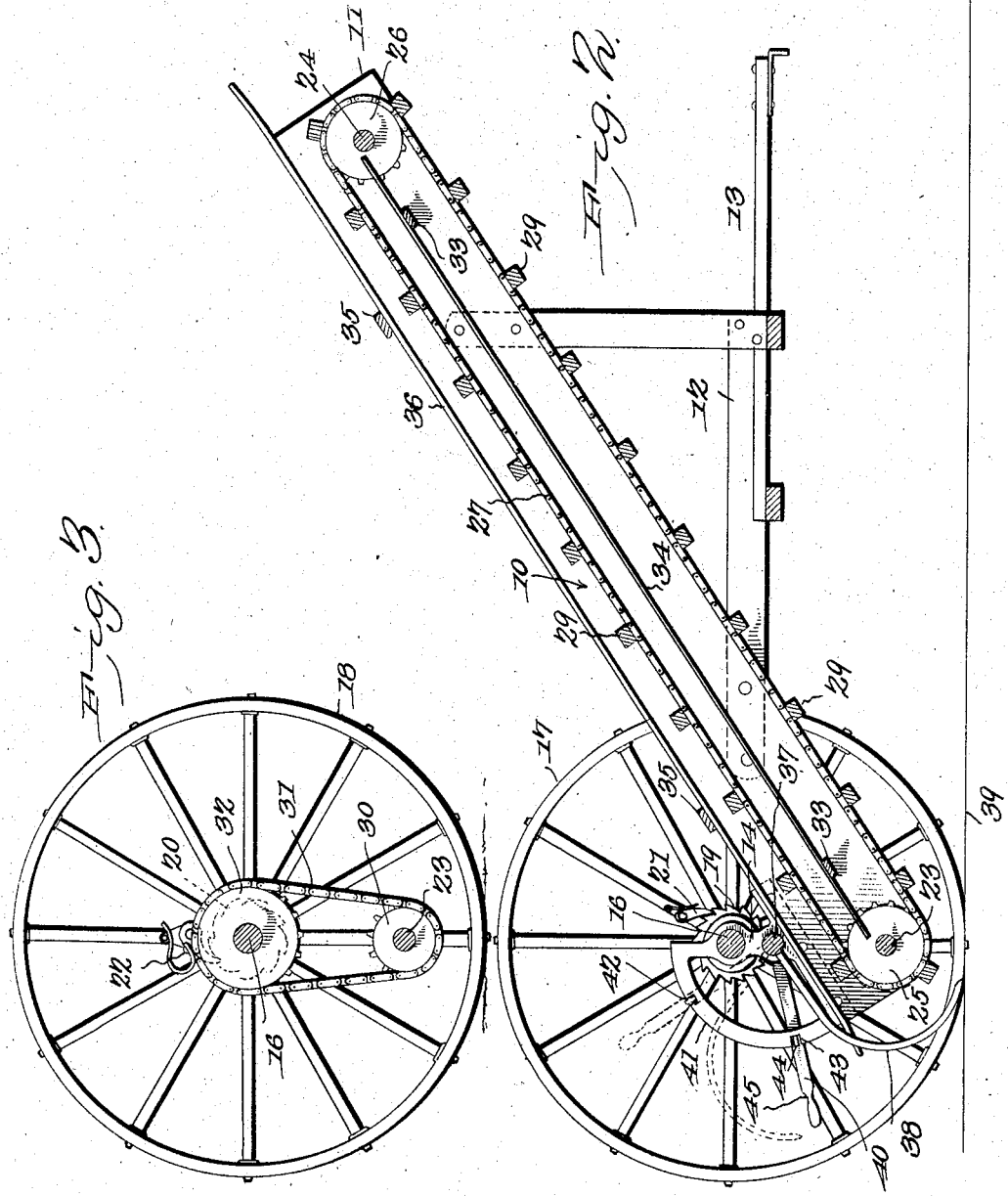

No. 791,375.

Patented May 30, 1905.

UNITED STATES PATENT OFFICE.

LEWIS G. SHULTZ, OF LAHARPE, ILLINOIS.

HAY RAKER AND LOADER.

SPECIFICATION forming part of Letters Patent No. 791,375, dated May 30, 1905.

Application filed June 2, 1904. Serial No. 210,849.

*To all whom it may concern:*

Be it known that I, LEWIS G. SHULTZ, a citizen of the United States, residing at Laharpe, in the county of Hancock and State of Illinois, have invented a new and useful Hay Raker and Loader, of which the following is a specification.

This invention relates to apparatus for raking and loading hay and similar products, and has for its object to improve the construction and increase the efficiency and convenience of operation.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claim made therefor.

In the drawings thus employed, Figure 1 is a plan view. Fig. 2 is a longitudinal sectional elevation. Fig. 3 is a sectional detail illustrating the manner of applying motion to the traveling apron.

The improved apparatus comprises a framework having spaced inclined side members 10 11, longitudinal supporting members 12, and a tongue 13, by which connection is made to the wagon or other receptacle for the hay, the latter not being shown, as it forms no part of the present invention.

Mounted for rotation upon the framework, near its lower end, as by brackets 14 15, is an axle 16, having bearing-wheels 17 18 journaled loosely upon its ends, the axle having ratchet-wheels 19 20 and the bearing-wheels having spring-controlled pawls 21 22 for engaging the ratchet-wheels, so that as the frame is drawn forward the axle will be rotated; but when the movement is reversed the axle will not be rotated, as will be obvious.

Mounted for rotation in the ends of the side members 10 11 are transverse shafts 23 24, having chain-pulleys 25 26 at their ends connected by endless chains 27 28, the chains in turn connected by transverse spaced slats 29, the whole forming an endless slatted carrier belt or apron. The lower shaft 23 is provided with a third chain-pulley 30, from which an endless chain 31 leads over a similar chain-pulley 32, fast on the axle 16, by which means motion is imparted to the endless slatted carrier as the apparatus is moved forward.

Supported upon transverse members 33 between the sides of the slatted belt are spaced longitudinal floor slats or bars 34, and supported above the slatted belt by transverse bars 35 are spaced compression-bars 36, the latter extending in advance of the slatted belt at the upper end and rearwardly of the same at the lower end, as shown. The floor-slats 34, as will be seen clearly by reference to Fig. 1, are disposed intercurrently with the compression slats or bars 36. Hence if the upper lead of the endless carrier should sag under the weight imposed thereon by the load or if a portion of the under side of the load should come in contact with the floor-slats the opposite or upper portion of the load will be permitted to project between the compression slats or bars, so that the load will be carried upward and the operation of the machine be continued without hindrance, owing to an excess of friction.

Mounted for rotation between the brackets 14 15 is a rock-shaft 37, having a plurality of curved resilient rake-teeth 38, spaced apart thereon and disposed when in operative position in the rear of the lower end of the slatted apron and spaced therefrom with their free ends traveling close to or in contact with the ground, (indicated at 39.) The shaft 37 is adapted to be rotated, as by a lever-arm 40, to elevate the rake-teeth when not in use and to hold the teeth in their elevated or depressed position. A segmental guide 41 is attached to one of the brackets, as 14, and provided with spaced notches 42 43, into which a lug 44 on the lever-arm 40 will alternately "spring" as the lever-arm is alternately elevated or depressed. Thus the rake-teeth may be firmly held down to their work or supported out of action, as required.

The spaced bars 36 are of resilient material, such as steel, and extend between the rake-bars, so that as the hay is gathered thereby and carried up by the endless apron the bars will yield, if necessary, to prevent choking or clogging and also to yield in event of undue pressure, and thus avoid breakage.

Another important advantage gained by resilient form of the bars is that when the rake-teeth are elevated any adhering hay will be "stripped" therefrom and prevented from clogging the parts.

As the apparatus is drawn forward the rake-teeth gather the material, and the slats on the downwardly-moving under side of the belt force the hay into the space within the rake-teeth and is caught by the slats and carried upward between the belt and compression-slats 36, the floor-slats 34 supporting the belt and preventing undue sagging of the same. The constantly-ascending web or "gavel" of hay is thus maintained under sufficient pressure to insure its upward movement, while at the same time in event of undue pressure the parts will yield to permit the material to pass without injury to the parts.

The floor-slats 34 are spaced below the ascending side of the slatted belt, and the compression-slats are likewise spaced above the same, and the transverse supporting members 35 are spaced from the shafts 23 24 to a sufficient extent to provide a relatively long "overhang" to the bars 36 at each end. Thus at the receiving end the resilient slats will yield and permit the material to freely enter and pass beneath the rigid lower one of the slats 35 and be thus compressed upon the floor-slats to insure the positive conveyance of the material, and then as the material approaches the discharge end the free overhanging upper ends of the slats 36 will yield sufficiently to permit it to pass over the chain-pulleys and be discharged. The action is thus positive and certain, and the material will be fed to the apron uniformly and discharged therefrom in a correspondingly uniform web or gavel.

It will thus be noted that a simply-constructed and efficient apparatus is produced, easily operated and handled, and will thoroughly gather and elevate the hay as the same is drawn over it as it lies on the ground.

Having thus fully described the invention, what is claimed is—

In a device of the class described, an inclined frame, an approximately horizontal frame connected therewith and having means for the attachment of draft, an axle supported for rotation, wheels upon said axle, a rock-shaft constituting a rake-head supported for oscillation between said axle and the lower end of the inclined frame, curved rake-teeth connected with said rake-head and extending in operative position around the lower end of the inclined frame, transverse shafts journaled in the upper and lower ends of said inclined frame, sprocket-wheels upon said shafts, an endless slatted carrier mounted upon said sprocket-wheels, transverse braces connecting the side members of the inclined frame between the upper and lower leads of the carrier, longitudinal floor-slats mounted upon said transverse braces, transverse braces supported by the frame and above the upper lead of the endless carrier, longitudinal resilient compression-bars supported by and connected with the under sides of said braces and disposed intercurrently with relation to the floor-slats the lower ends of said resilient bars being extended between and in rear of the curved rake-teeth; said compression-bars cooperating with the rake-teeth to convey material gathered by the latter between the upper lead of the carrier and said compression-bars.

In testimony that I claim the foregoing as my own I have hereto affixed my signature in the presence of two witnesses.

LEWIS G. SHULTZ.

Witnesses:
THOS. J. SCOTT,
JOHN M. DE LAPP.